United States Patent
Yang et al.

(10) Patent No.: US 8,248,937 B2
(45) Date of Patent: Aug. 21, 2012

(54) PACKET FORWARDING DEVICE AND LOAD BALANCE METHOD THEREOF

(75) Inventors: Kai-Yu Yang, Taipei Hsien (TW); Yao-Wen Chang, Taipei-Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 333 days.

(21) Appl. No.: 12/763,148

(22) Filed: Apr. 19, 2010

(65) Prior Publication Data

US 2011/0182182 A1  Jul. 28, 2011

(30) Foreign Application Priority Data

Jan. 28, 2010  (CN) .......................... 2010 1 0300819

(51) Int. Cl.
*G01R 31/08* (2006.01)
(52) U.S. Cl. ..................................................... 370/232
(58) Field of Classification Search .............. 370/229, 370/232, 359, 395.31, 395.5, 395.21, 419, 370/428, 230, 351, 420
See application file for complete search history.

(56) References Cited

U.S. PATENT DOCUMENTS

| 7,554,918 | B1 * | 6/2009 | Moore .......................... 370/235 |
| 7,554,997 | B1 * | 6/2009 | Schlichter et al. ............ 370/402 |
| 7,675,890 | B2 | 3/2010 | Wang |
| 8,010,877 | B2 * | 8/2011 | Sawada ......................... 714/774 |
| 8,174,971 | B2 * | 5/2012 | Hung et al. ................... 370/230 |

* cited by examiner

*Primary Examiner* — Kwang B Yao
*Assistant Examiner* — Anh Ngoc Nguyen
(74) *Attorney, Agent, or Firm* — Altis Law Group, Inc.

(57) ABSTRACT

A packet forwarding device stores a predetermined threshold and a predetermined condition value of a first wide area network (WAN) port, and forwards packets that comply with the predetermined condition value via the first WAN port and forwards packets that do not comply with the predetermined condition value via a second WAN port. The packet forwarding device forwards some of the packets that do not comply with the predetermined condition value via the first WAN port in order to balance loads of the first and second WAN ports if the traffic value of the packets forwarded via the first WAN port is equal to or less than the predetermined threshold.

8 Claims, 5 Drawing Sheets

PACKET FORWARDING DEVICE AND LOAD BALANCE METHOD THEREOF

BACKGROUND

1. Technical Field

Embodiments of the present disclosure relate to network communication, and more particularly to a packet forwarding device and a load balance method thereof.

2. Description of Related Art

Currently, a packet forwarding device often sets a predetermined condition value, such as packet source addresses, packet sizes, and packet protocol types, then forwards packets that complies with the predetermined condition value via one WAN port of the packet forwarding device, and forwards packets that do not comply with the predetermined condition value via another WAN port of the packet forwarding device.

For example, referring to FIG. 5, a traditional packet forwarding device 20a receives a plurality of packets from a CPE 101a, a CPE 103a, and a CPE 105a via a first LAN port 218a, a second LAN port 220a, and a third LAN port 222a, respectively. For example, the packet protocol types of the received packets comprise A, B, and C. The packet protocol type of the predetermined condition value is set to A. In such a case, the first WAN port 214a only forwards packet A, and the second WAN port 216a forwards packets B and C. Thus, there is a load imbalance between the first WAN port 214a and the second WAN port 216a, which reduces forwarding efficiency of the packet forwarding device 20a.

BRIEF DESCRIPTION OF THE DRAWINGS

The details of the disclosure, both as to its structure and operation, can best be understood by referring to the accompanying drawings, in which like reference numbers and designations refer to like elements.

DETAILED DESCRIPTION

All of the processes described may be embodied in, and fully automated via, software code modules executed by one or more general purpose computers or processors. The code modules may be recorded in any type of computer-readable medium or other storage device. Some or all of the methods may alternatively be embodied in specialized computer hardware or communication apparatus.

Figure 1:
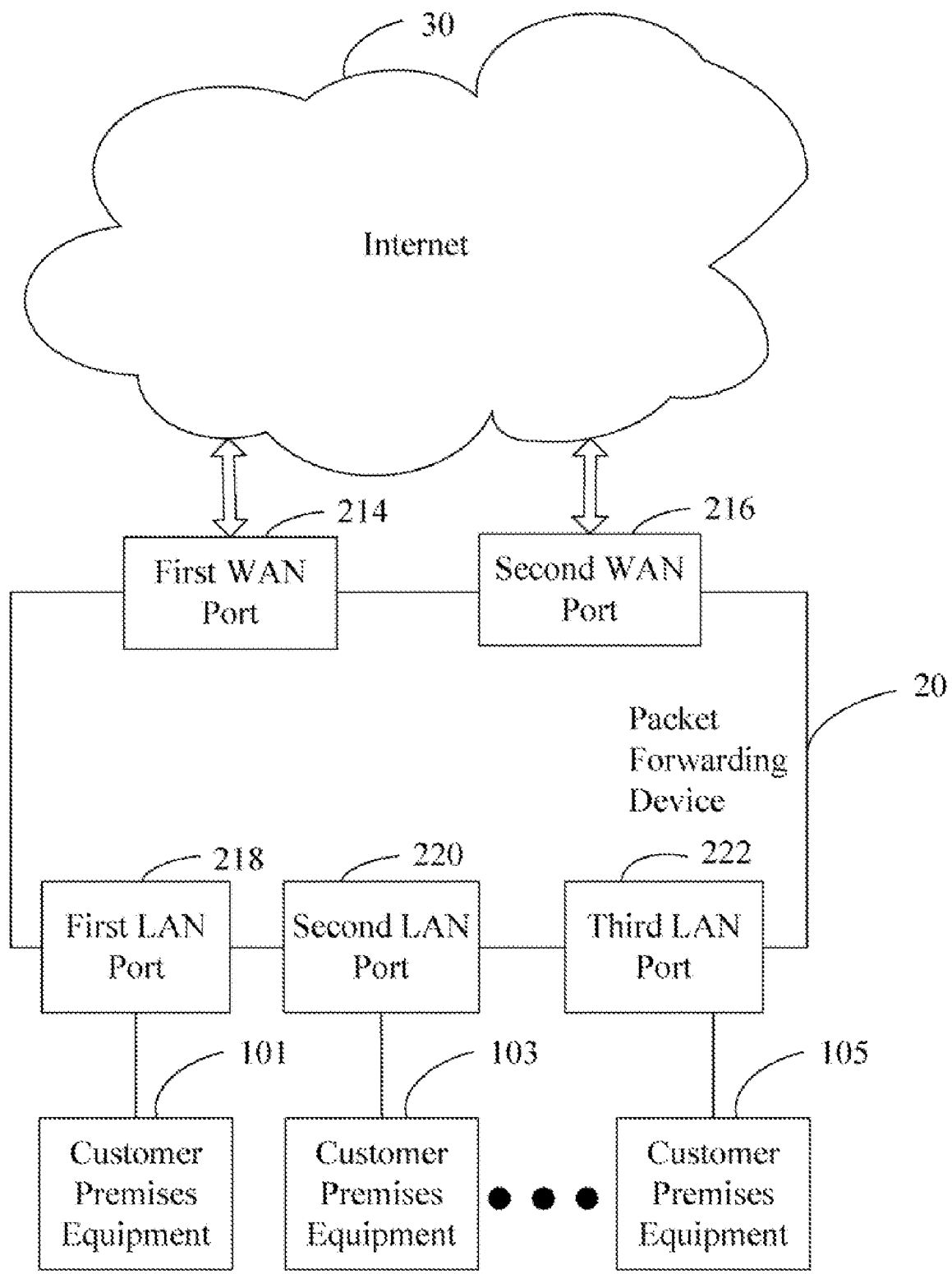
FIG. 1 is a schematic diagram of an application environment of one embodiment of a packet forwarding device of the present disclosure.

FIG. 1 is a schematic diagram of an application environment of one embodiment of a packet forwarding device 20 of the present disclosure. In one embodiment, a plurality of customer premise equipment (CPE) 101, 103, . . . , 105 connect to the Internet 30 via the packet forwarding device 20. In the embodiment, the CPEs 101, 103, . . . , 105 may be personal computers, or personal digital assistants, for example. The packet forwarding device 20 comprises at least two wide area network (WAN) ports 214, 216 and a plurality of local area network (LAN) ports 218, 220, 222. The WAN ports 214, 216 connect to the Internet 30 and the LAN ports 218, 220, 222 connect to the plurality of the CPE 101, 103, . . . , 105, respectively. In one embodiment, the packet forwarding device 20 may be a router, a gateway, or a cable modem, for example.

Figure 2:
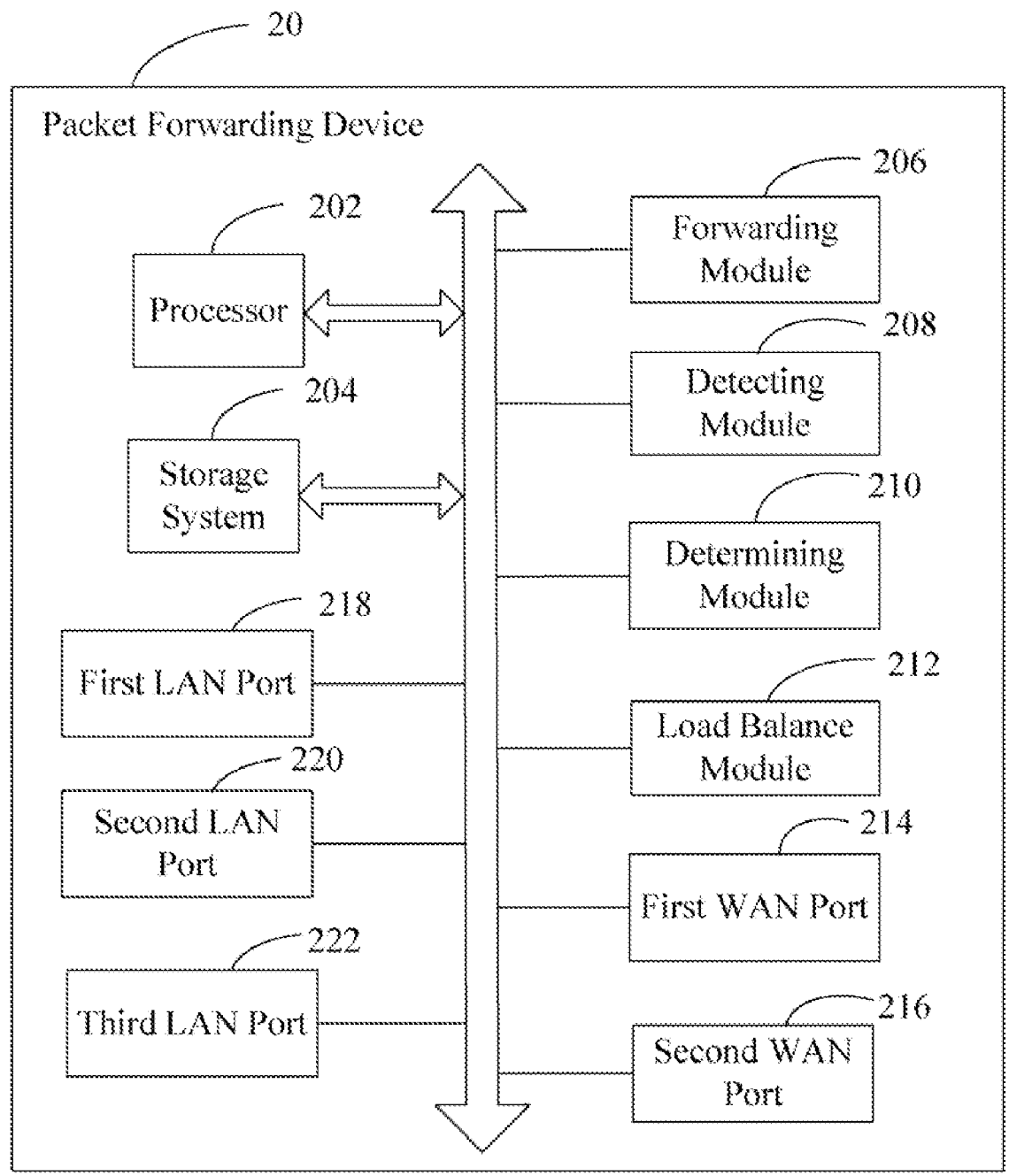
FIG. 2 is a schematic diagram of functional modules of one embodiment of the packet forwarding device of the present disclosure.

FIG. 2 is a schematic diagram of functional modules of one embodiment of the packet forwarding device 20 of the present disclosure. In one embodiment, the packet forwarding device 20 comprises a processor 202, a storage system 204, a forwarding module 206, a detecting module 208, a determining module 210, a load balance module 212, a first WAN port 214, a second WAN port 216, a first LAN port 218, a second LAN port 220, and a third LAN port 222. In one embodiment, the first LAN port 218, the second LAN port 220, and the third LAN port 222 are operable to receive a plurality of packets from the CPE 101, the CPE 103, and the CPE 105, respectively. In one embodiment, the first WAN port 214 and the second WAN port 216 are operable to forward the packets to the Internet 30. The packets maybe transmission control protocol (TCP) packets or user datagram protocol (UDP) packets, for example.

The forwarding module 206, the detecting module 208, the determining module 210, and the load balance module 212 comprise one or more computerize codes that are stored in the storage system 204 and are operable to be executed by the processor 202.

The storage system 204 is operable to store a predetermined threshold and a predetermined condition value of the first WAN port 214. In one embodiment, the predetermined threshold of the first WAN port 214 is a maximum traffic value of the first WAN port 214.

The forwarding module 206 is operable to forward packets that comply with the predetermined condition value via the first WAN port 214, and forward packets that do not comply with the predetermined condition value via the second WAN port 216. In one embodiment, the predetermined condition value comprises packet source addresses, packet sizes and packet protocol types. For example, the packet protocol type of the predetermined condition value can be set to a TCP, which indicates that the forwarding module 206 forwards packets that comply with the packet protocol type of TCP via the first WAN port 214 and forwards packets that do not comply with the packet protocol type of TCP via the second WAN port 216.

The detecting module 208 is operable to detect a load state of the second WAN port 216. In one embodiment, if none of the packets forwarded via the second WAN port 216 have been lost, the load state of the second WAN port 216 is normal, and if some of the packets forwarded via the second WAN port 216 have been lost, the load state of the second WAN port 216 is overloaded, for example.

The determining module 210 is operable to determine whether some of the packets forwarded via the second WAN port 216 have been lost. In one embodiment, the forwarding module 206 forwards packets to the Internet 30, and receives response packets from the Internet 30 within a predetermined time period. If the forwarding module 206 fails to receive response packets from the Internet 30 within the predetermined time period, the determining module 210 determines some of the packets forwarded via the second WAN port 216 have been lost. In contrast, if the forwarding module 206 receives response packets from the Internet 30 within the predetermined time period, the determining module 210 determines none of the packets forwarded via the second WAN port 216 have been lost.

In one embodiment, none of the packets forwarded via the second WAN port 216 have been lost indicates that the load state of the second WAN port 216 is normal. In such a case, the forwarding module 206 is further operable to continue forwarding packets that do not comply with the predetermined condition value via the second WAN port 216.

In another embodiment, some of the packets forwarded via the second WAN port 216 have been lost indicates that the load state of the second WAN port 216 is overloaded. In such a case, the determining module 210 further determines whether a traffic value of the packets forwarded via the first WAN port 214 is greater than the predetermined threshold.

The load balance module 212 is operable to forward some of the packets that do not comply with the predetermined condition value via the first WAN port 214 in order to balance loads of the first WAN port 214 and the second WAN port 216 if the traffic value of the packets forwarded via the first WAN port 214 is equal to or less than the predetermined threshold.

In one embodiment, the traffic value of the packets forwarded via the first WAN port 214 is equal to or less than the predetermined threshold indicates that a load of the first WAN port 214 is normal and the second WAN port 216 is overloaded. In one embodiment, the load balance module 212 forwards some of packets that do not comply with the predetermined condition value via the first WAN port 214 in order to balance loads of the first WAN port 214 and the second WAN port 216 to improve an efficiency of processing packets in the packet forwarding device 20.

In one embodiment, the traffic value of the packets forwarded via the first WAN port 214 is great than the predetermined threshold, then both the first WAN port 214 and the second WAN port 216 are overloaded. In such a case, the forwarding module 206 continues forwarding packets that do not comply with the predetermined condition value via the second WAN port 216.

Figure 5:
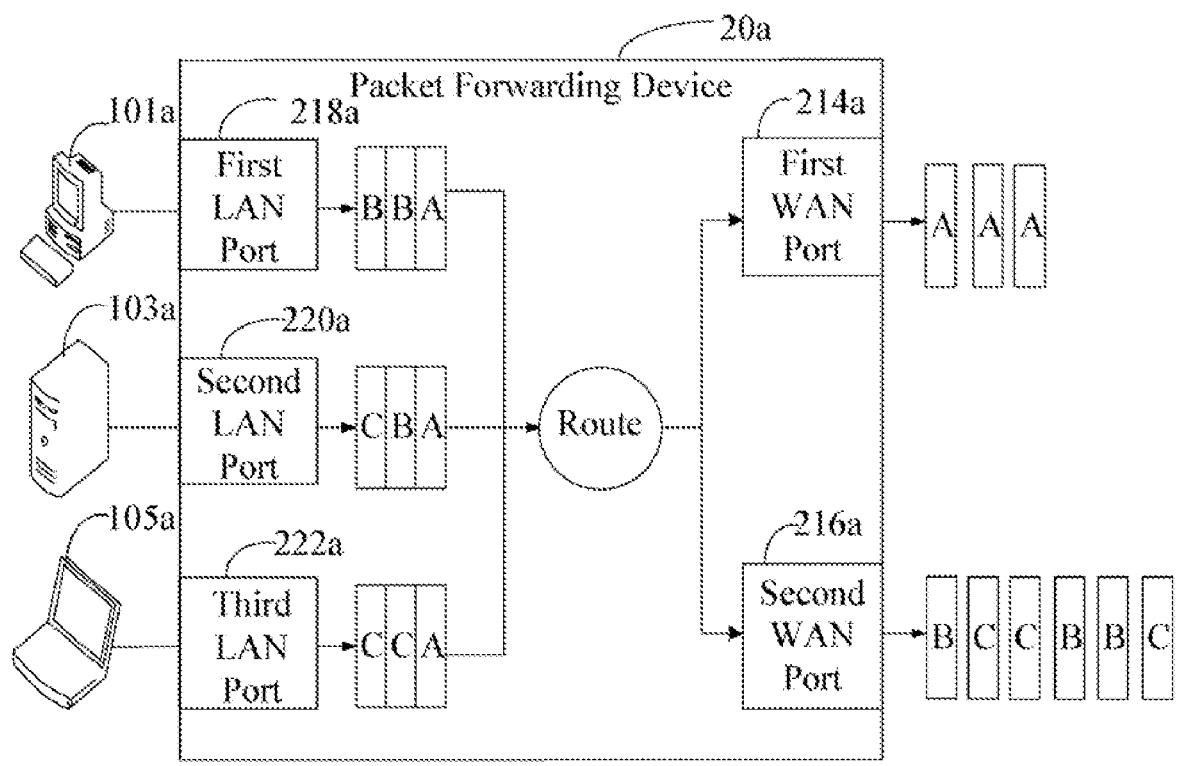
FIG. 5 is a schematic diagram showing a traditional packet forwarding device forwarding packets.

FIG. 5 is a schematic diagram showing a commonly used packet forwarding device forwarding packets. In this embodiment, the first WAN port 214a and the second WAN port 216a may forward packets at a speed of five per second, and accordingly the predetermined threshold of the first WAN port 214a and the second WAN port 216a is five packets per second. The speed is also referred to as the traffic value. In this embodiment, the second WAN port 216a may lose packets because the current traffic value of the second WAN port 216a achieves six packets per second, exceeding the predetermined threshold. At the same time, the current traffic value of the first WAN port 214a is three packets per second, less than the predetermined threshold. In such a case, the load state of the first WAN port 214a is normal and the second WAN port 216a is overloaded.

Figure 3:
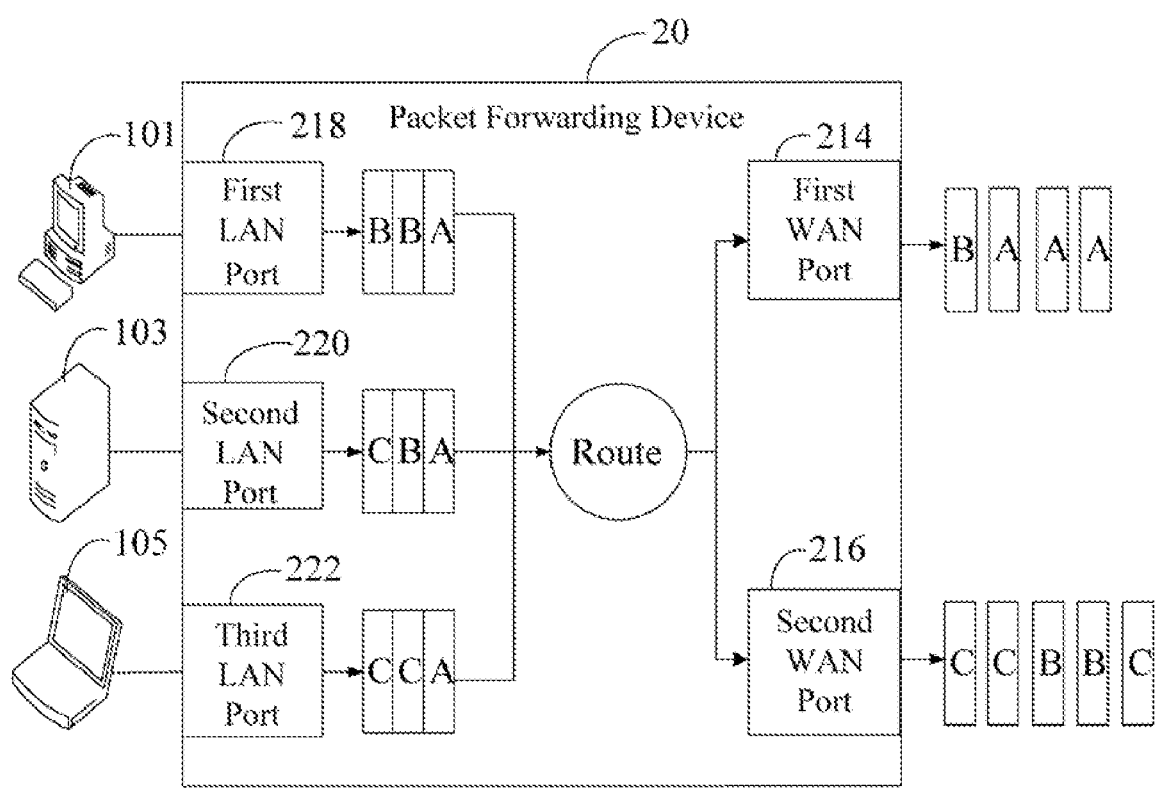
FIG. 3 is a schematic diagram showing the packet forwarding device forwarding packets of the present disclosure.

FIG. 3 is a schematic diagram showing the packet forwarding device 20 forwarding packets of the present disclosure. In this embodiment, if the load state of the first WAN port 214 is normal and the second WAN port 216 is overloaded, the packet forwarding device 20 forwards the packets not complied the predetermined condition value to the Internet 30 via the first WAN port 214 in order to balance the loads of the first WAN port 214 and the second WAN port 216.

For example, the packet protocol types of the received packets can comprise a TCP, a UDP, and a hypertext transfer protocol (HTTP). The packet protocol type of the predetermined condition value is set to the TCP. The packet forwarding device 20 only forwards packets of TCP via the first WAN port 214, and forwards packets of UDP and HTTP via the second WAN port 216, before balancing the loads of the first WAN port 214 and the second WAN port 216. If the load state of the first WAN port 214 is normal and the second WAN port 216 is overloaded, the packet forwarding device 20 forwards packets of TCP and UDP via the first WAN port 214, and forwards packets of UDP and HTTP via the second WAN port 214. In such a case, the loads of the first WAN port 214 and the second WAN port 216 are balanced. Thus, the forwarding efficiency in the packet forwarding device 20 is improved.

Figure 4:
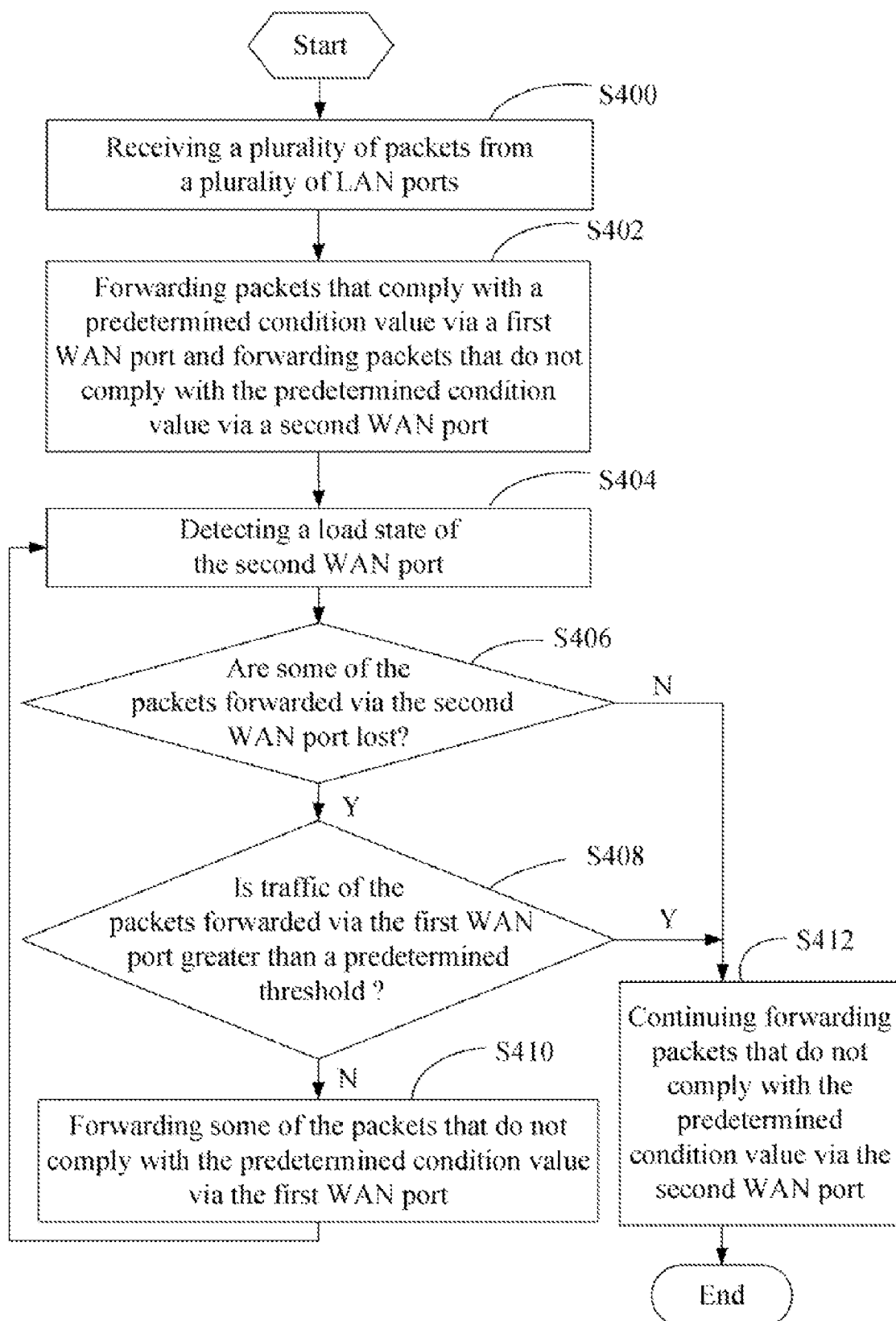
FIG. 4 is a flowchart of a load balance method of one embodiment of the packet forwarding device of the present disclosure.

FIG. 4 is a flowchart of a load balance method of one embodiment of the packet forwarding device 20 of the present disclosure. The load balance method can be, for example, executed by the functional modules of the packet forwarding device 20 of FIG. 2. Depending on the embodiment, additional blocks may be added, others deleted, and the ordering of the blocks may be changed while remaining well within the scope of the disclosure.

In block S400, a plurality of LAN ports receive a plurality of packets from the CPE. In one embodiment, the first LAN port 218, the second LAN port 220, and the third LAN port 222 receive a plurality of packets form the CPE 101, the CPE 103, and the CPE 105, respectively.

In block S402, the forwarding module 206 forwards packets that comply with the predetermined condition value via the first WAN port 214 and forwards packets that do not comply with the predetermined condition value via the second WAN port 216. In one embodiment, the predetermined condition value comprises packet source address, packet size and packet protocol type. For example, the packet protocol type of the predetermined condition value is set to the TCP indicates that the forwarding module 206 forwards packets that comply with the packet protocol type of TCP via the first WAN port 214 and forwards packets that do not comply with the packet protocol type of TCP via the second WAN port 216.

In block S404, the detecting module 208 detects a load state of the second WAN port 216.

In block S406, the determining module 210 determines whether some of the packets forwarded via the second WAN port 216 have been lost. Normally, the forwarding module 206 forwards packets to the Internet 30, and receives response packets from the Internet 30 within the predetermined time period. If the forwarding module 206 fails to receive response packets from the Internet 30 within the predetermined time period, the determining module 210 determines that some of the packets forwarded via the second WAN port 216 have been lost. In contrast, if the forwarding module 206 receives response packet from the Internet 30 within the predetermined time period, the determining module 210 determines that none of the packets forwarded via the second WAN port 216 have been lost.

In one embodiment, if some of the packets forwarded via the second WAN port 216 have been lost, then in block S408, the determining module 210 continues determining whether a traffic value of the packets forwarded via the first WAN port 214 is greater than the predetermined threshold.

In one embodiment, none of the packets forwarded via the second WAN port 216 have been lost, indicating that the load state of the second WAN port 216 is normal, then in block S412, the forwarding module 206 continues forwarding packets that do not comply with the predetermined condition value via the second WAN port 216.

In one embodiment, the traffic value of the packets forwarded via the first WAN port 214 is equal to or less than the predetermined threshold, then in block S410, the load balance module 212 forwards packets that do not comply with the predetermined condition value via the first WAN port 214 in order to balance the load of the second WAN port 216.

In one embodiment, the traffic value of the packets forwarded via the first WAN port 214 is greater than the predetermined threshold, and then in block S412, the forwarding module 206 continues forwarding packets that do not comply with the predetermined condition value via the second WAN port 216.

In one embodiment, the packet forwarding device 20 detects the state of the second WAN port 216, and forwards packets that do not comply with the predetermined condition value via the first WAN port 214 in order to balance load if some of the packets forwarded via the second WAN port 216 have been lost and the traffic value of the packets forwarded via the first WAN port 214 is equal to or less than the predetermined threshold. Thus, the packet forwarding device 20 reduces packet lost when forwarding packets and improves processing efficiency greatly.

While various embodiments and methods of the present disclosure have been described, it should be understood that they have been presented by example only and not by limitation. Thus the breadth and scope of the present disclosure should not be limited by the above-described embodiments, but should be defined only in accordance with the following claims and their equivalents.

What is claimed is:

1. A packet forwarding device, comprising:
a plurality of local area network (LAN) ports operable to receive a plurality of packets;
a first wide area network (WAN) port;
a second WAN port;
a storage system operable to store a predetermined threshold and a predetermined condition value of the first WAN port;
a forwarding module operable to forward packets that comply with the predetermined condition value via the first WAN port and forward packets that do not comply with the predetermined condition value via the second WAN port;
a detecting module operable to detect a load state of the second WAN port;
a determining module operable to determine whether some of the packets forwarded via the second WAN port have been lost, and determine whether a traffic value of the packets forwarded via the first WAN port is greater than the predetermined threshold if some of the packets forwarded via the second WAN port have been lost;
a load balance module operable to forward some of the packets that do not comply with the predetermined condition value via the first WAN port in order to balance loads of the first and second WAN ports if the traffic of the packets forwarded via the first WAN port is equal to or less than the predetermined threshold; and
a processor operable to execute the forwarding module, the detecting module, the determining module, and the load balance module.

2. The packet forwarding device as claimed in claim 1, wherein the predetermined condition value comprises packet source addresses, packet sizes and packet protocol types.

3. The packet forwarding device as claimed in claim 1, wherein the forwarding module is further operable to continue forwarding the packets that do not comply with the predetermined condition value via the second WAN port if none of the packets forwarded via the second WAN port have been lost.

4. The packet forwarding device as claimed in claim 1, wherein the forwarding module is further operable to continue forwarding the packets that do not comply with the predetermined condition value via the second WAN port if the traffic value of the packets forwarded via of the first WAN port is greater than the predetermined threshold.

5. A load balance method of a packet forwarding device, the packet forwarding device comprising a first wide area network (WAN) port, a second WAN port, a storage system, a processor, and a plurality of local area network (LAN) ports, the storage system storing a predetermined threshold and a predetermined condition value of the first WAN port, the load balance method comprising:
receiving a plurality of packets from the plurality of LAN ports;
forwarding packets that comply with the predetermined condition value via the first WAN port and forwarding packets that do not comply with the predetermined condition value via the second WAN port;
detecting a load state of the second WAN port;
determining whether some of the packets forwarded via the second WAN port have been lost;
determining whether a traffic value of the packets forwarded via the first WAN port is greater than the predetermined threshold if some of the packets forwarded via the second WAN port have been lost; and
forwarding some of the packets that do not comply with the predetermined condition value via the first WAN port in order to balance loads of the first and second WAN ports if the traffic value of the packets forwarded via the first WAN port is equal to or less than the predetermined threshold.

6. The load balance method of the packet forwarding device as claimed in claim 5, wherein the predetermined condition value comprises packet source addresses, packet sizes and packet protocol types.

7. The load balance method of the packet forwarding device as claimed in claim 5, further comprising continuing forwarding the packets that do not comply with the predetermined condition value via the second WAN port if none of the packets forwarded via the second WAN port have been lost.

8. The load balance method of the packet forwarding device as claimed in claim 5, further comprising continuing forwarding the packets that do not comply with the predetermined condition value via the second WAN port if the traffic value of the packets forwarded via the first WAN port is greater than the predetermined threshold.

* * * * *